Sept. 29, 1959      C. R. WILSON      2,907,026

WAVEFORM GENERATORS

Filed Jan. 31, 1955

INVENTOR
CLARK R. WILSON
BY
ATTORNEY

United States Patent Office 2,907,026
Patented Sept. 29, 1959

2,907,026

WAVEFORM GENERATORS

Clark R. Wilson, Glen Ridge, N.J., assignor to International Telephone and Telegraph Corporation, Nutley, N.J., a corporation of Maryland Application January 31, 1955, Serial No. 484,965

4 Claims. (Cl. 343—17.1)

This invention relates to waveform generators and more particularly to a waveform generator whose output may be utilized to control the sensitivity of the receiver portion of a pulse signal system.

There are many pulse signal systems in which the control of receiver sensitivity is important. Included in these systems is the echo pulse type of system. In echo pulse type signal systems, the sweep trace on an oscillograph is initiated simultaneously with the triggering of the transmitted pulses which are radiated to illuminate targets whose ranges are to be determined or to initiate identification systems disposed in the targets. The transmitted pulses cause the initiation of secondary pulses emanating in succession from the targets. The received secondary pulses produce along the sweep trace of the oscillograph corresponding deflections therein indicating the range of the different targets and/or identification information simultaneously to the eye of the observer. The reflections from objects at a short distance from the receiver are usually relatively strong and the average strength of the received reflections or emanations decreases with distance. When it is desired that the objects or targets at a particular distance be illuminated, it is necessary to adjust the gain of the receiver so that the sweep trace deflections for this particular target are of suitable amplitude. However, when the receiver is thus adjusted, the usual result is that only a portion of the trace on the oscillograph screen is usable.

Heretofore, the sensitivity of echo pulse type receiving apparatus has commonly been controlled in accordance with a square wave signal operating to bring or gate the receiver to full sensitivity immediately upon the initiation of the transmitted pulse and holding the receiver at full sensitivity for the duration of the sweep. Such an arrangement has the disadvantage of permitting the reflections from nearby targets to saturate the receiver and in some instances so over saturate the receiver that reflections from more distant targets are obscured. Various prior art arrangements have been devised to overcome this receiver saturation. One such arrangement constitutes a feedback circuit coupled to the last intermediate frequency (IF) amplifier stage to vary the gain of previous IF amplifiers to compensate for this receiver saturation. By improper feeding back, instability can result. Another arrangement constitutes a circuit which lowers the receiver gain immediately following the transmitted pulse and then increases the gain steadily in a predetermined fashion until maximum receiver sensitivity is reached. In certain prior art variations of the latter arrangement, the gain of the receiver is controlled linearly in accordance with a sawtooth waveform such that maximum receiver gain is not achieved until substantially the entire sweep period is completed.

A major disadvantage of the prior art arrangements to overcome receiver saturation is the necessity of a circuit separate from the receiver gate circuit to control the gain of the receiver for the initial portion of the sweep period. A further disadvantage particularly in the latter mentioned prior art arrangement is the necessity of synchronizing the two sources of pulses, the receiver gate pulse and the gain time control (GTC) pulse.

Therefore, it is an object of this invention to provide an improved wave form generator for employment in pulse signal systems to overcome the disadvantages of the heretofore employed receiver sensitizing circuits.

Another object of this invention is to provide a waveform generator having an output derived from a single signal source which has an initial portion whose amplitude is adjustable with respect to time and a later portion continuous with the initial portion whose amplitude is constant.

Still another object of this invention is to provide from a single signal source a waveform capable of gating a receiver and/or controlling the senstivity of the receiver in the initial portion of the receiver sensitivity period to compensate for receiver saturation.

A feature of this invention is the provision of a square wave generator, either of the free-running type or triggered type, to produce at the output thereof a recurrent square wave. A pair of output paths are coupled to the output of the square wave generator, one of said paths coupling the square wave directly to a mixing means and the other of said paths including a differentiating network to couple the differentiated square wave or GTC signal to the mixing means. The mixing means functions to superimpose the GTC signal, a signal of sawtooth-like configuration of polarity opposite to the square wave, on the initial portion of the original square wave to provide at the output thereof a complex control signal characterized by an initial or leading portion having a corresponding amplitude characteristic with respect to time and a remaining or trailing portion having a constant amplitude.

Another feature of this invention is the provision of variable components as circuit elements of the square wave generator, the mixing means and the differentiating network to enable control of the width of the square wave signal, of the amplitude of the square wave signal, of the width of the GTC signal and of the amplitude of the GTC signal thereby providing a complete control of the sensitivity of receiving or the like equipment from instantaneous full sensitivity throughout the square wave or gate period through no initial sensitivity with a steady increase, not necessarily linear, to full sensitivity after elapse of a portion of the gate period.

The above-mentioned and other features and objects of this invention will become more apparent by reference to the following description taken in conjunction with the accompanying drawings, in which.

Figure 1:
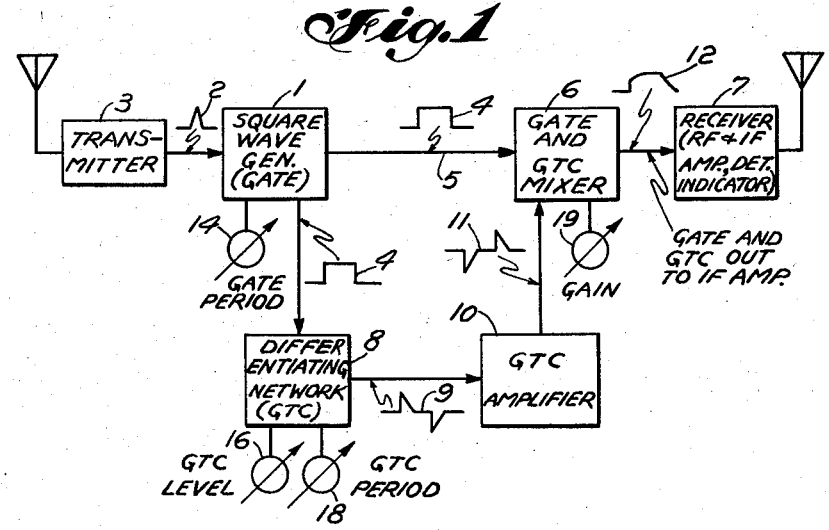
Fig. 1 is a circuit in block diagram form of the waveform generator of this invention as it would be utilized in an echo pulse signal system.

Referring to Fig. 1, there is illustrated in block diagram form the waveform generator or receiver sensitizing circuit of this invention utilized in conjunction with an echo pulse signal system to substantially eliminate receiver saturation due to nearby targets. The waveform generator is illustrated as including as the single signal source thereof a square wave generator 1, the output of which is modified in a manner hereinbelow described to provide a complex control signal including a gain time control portion and a constant amplitude gate portion. The generator 1 may be of the free-running type and thereby establish its own recurrent frequency, or it may be of the triggered type whereby the recurrent frequency of the output is established by the recurrent frequency of the triggering source.

As illustrated, generator 1 is synchronized by a trigger pulse 2 produced in transmitter 3 of the echo pulse signal system simultaneously with the radiation of the illuminating pulse signal. The triggered output waveform 4 of generator 1 is coupled via conductor 5 to the mixer circuit 6. The waveform 4 constitutes the usual pulse which heretofore was employed directly to immediately bring receiver 7 of the echo pulse signal system to instantaneous full sensivity.

Waveform 4 is coupled over a second output path to a differentiating network 8 which differentiates waveform 4 to produce the GTC signal or differentiated square wave 9. The differentiated square wave is amplified and inverted in polarity in amplifier 10 and coupled to mixer circuit 6. Mixer circuit 6 functions to combine the inverted waveform 11 and the gate waveform 4 in a manner to produce a complex control signal 12. Control signal 12 is characterized by having a rate of change of amplitude occurring in the initial portion thereof such that the IF amplification of receiver 7 is controlled in a manner to be less sensitive in the initial portion of the gating period to thereby render receiver 7 less sensitive to nearby targets. The amplitude rate of increase of control signal 12 is such that full receiver sensitivity is achieved after a given portion of the gate period has elapsed and thereby renders receiver 7 sensitive for reception of secondary pulses reflected from distant objects.

Figure 2:
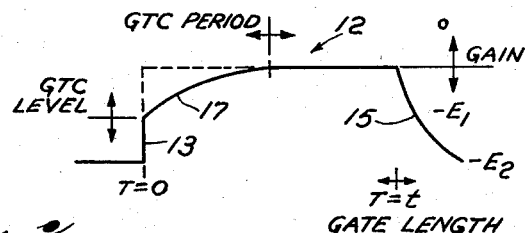
Fig. 2 is a representative illustration of the waveform produced by the waveform generator of Fig. 1.

The characteristic of complex control signal 12 is shown in greater detail in Fig. 2 and is useful in illustrating the various controls present in the waveform generator of Fig. 1. The vertical portion 13 of control signal 12 is considered the leading edge of the control signal and the zero time base thereof. Square wave generator 1 includes therein a variable component which may be varied by control 14 to adjust the length or period of the receiver gate, pulse 4. In other words, control 14 establishes the time at which the trailing edge 15 of control signal 12 occurs. The control 16 is associated with a variable input circut for network 8 which adjusts the amplitude of waveform 4 applied thereto. This enables a control of the level or amplitude of the resultant differentiated or GTC waveform and, thereby, a control of the point along leading edge 13 at which the GTC waveform commences, as represented by line 17. There is further provided in association with network 8 a variable component controllable by control 18 which adjusts the length or width of the differentiated output thereof which enables an adjustment of the GTC period. In other words, the portion of the control signal 12 occupied by the GTC waveform. The amplitude of control signal 12, the maximum gain of receiver 7, is variable by means of control 19 which adjusts a variable component disposed within mixer circuit 6. Further, by proper selection of components, within mixer circuit 6, the D.C. level at the bottom of control signal 12 may be selected to keep the receiver desensitized at any desired level between gate signals or when the square wave generator 1 is not triggered. By proper manipulation of the various control the conductor to the IF amplifier section of receiver 7 may contain a D.C. voltage only, a signal corresponding to that of waveform 4 with the same D.C. voltage at its top during the gate period, or the mixed GTC and gate signal as represented by control signal 12. The output from mixer 6 is D.C. coupled to the IF amplifier section of receiver 7 to eliminate large capacitors and clamping diodes. The waveform generator is operated from B— to ground to enable the production of a positive going negative waveform to facilitate the sensitivity control of receiver 7.

Figure 3:
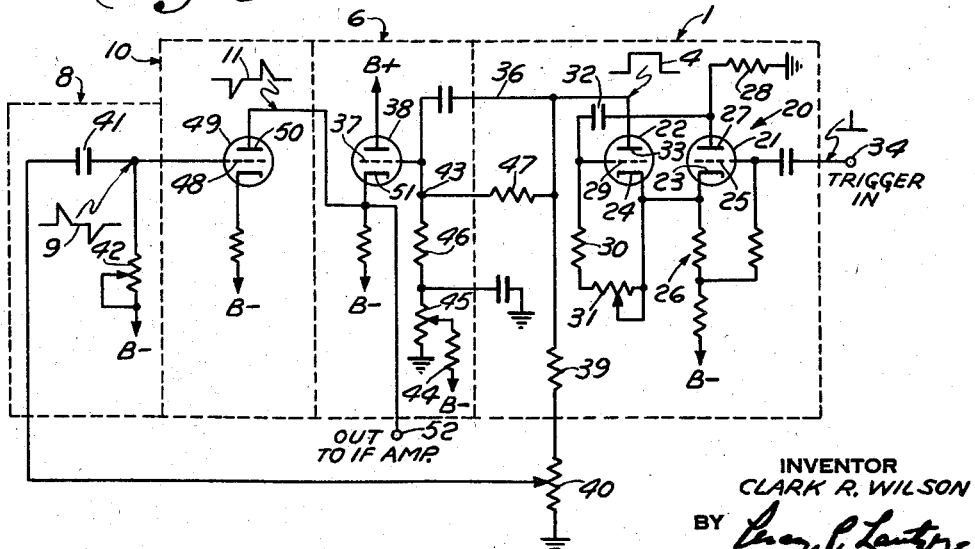
Fig. 3 is a schematic diagram of one form of the waveform generator of Fig. 1.

Referring to Fig. 3, a specific embodiment of the waveform generator of Fig. 1 is illustrated to include a single shot multivibrator 20 as the square wave generator 1. Multivibrator 20 comprises electron discharge devices 21 and 22 whose cathodes 23 and 24, respectively, are coupled to a common point. The cathodes 23 and 24 are coupled to a negative voltage source and the grid 25 of device 21 is biased to a point more negative with respect to cathode 23 by embodiment of a voltage divider 26 connected between the cathodes 23 and 24 and the B— supply. The anode 27 of device 21 is coupled to ground potential through the load resistor 28. The control grid 29 of device 22 is returned to its cathode 24 by means of a grid leak resistor 30 and the variable resistor 31. The output of discharge device 21 is coupled to discharge device 22 by means of a condenser 32 connected between anode 27 and control grid 29. Under quiescent conditions, there is no output from anode 33 of device 22, however, a triggering pulse applied to terminal 34 produces an output from anode 33 as indicated by curve 44. The length or period of the square wave output of multivibrator 20 is basically established by the time constant consisting of condenser 32, resistor 30 and variable resistor 31. Thus, the period of gate signal 4 may be selected by adjusting resistor 31 through means of control 14 of Fig. 1.

The waveform 4 is A.C. coupled via lead 36 and D.C. coupled by means of resistor 47 to the grid 37 of electron discharge device 38, constituting the primary component of mixer 6. Waveform 4 is also coupled from anode 33 to the input circuit of the differentiating circuit 8, resistors 39 and 40. The signal differentiation or GTC signal production is accomplished by comprising the time constant condenser 41 and variable resistor 42. Resistor 40 is made variable for adjustment via control 16 of Fig. 1 of the amplitude of the waveform 4 applied to differentiating network time constant. The control 18 of Fig. 1 varies the adjustable resistor 42 of the differentiating network time constant in a manner to adjust the width of the differentiated signal.

It will be observed that a voltage potential is supplied at point 43 by means of a B— source and resistors 44, 45 and 46. The voltage or potential at point 43 constitutes the bias voltage for grid 37 of device 38.

The differentiated or GTC signal is coupled from the junction of condenser 41 and variable resistor 42 to the grid 48 of discharge device 49 included as a component of amplifier 10. Amplifier 10 amplifies a differentiating signal 9 and inverts this signal for coupling from the anode 50 of device 49 to the cathode 51 of device 38. Device 38 functions to mix the inverted differentiating signal 11 with the waveform 4 for coupling from the cathode 51 through terminal 52 to the IF amplifier section of receiver 7. The amplitude level of control signal 12, the overall gain of receiver 7, is adjustable by means of control 19 of Fig. 1 which varies the resistance of variable resistor 45 and hence the bias voltage applied to grid 37 of discharge device 38.

While the waveform generator of this invention has been described in connection with echo pulse systems, the waveform generator is not restricted to the utilization therewith. The waveform generator described herein could be utilized to prevent receiver saturation by radiated pulses from closely adjacent transmitters, such as may occur in distance measuring (DME) systems and the like, which would obscure the desired pulse signals. It is to be clearly understood that the description herein is made only by way of example and not as a limitation to the scope of my invention as set forth in the objects thereof and in the accompanying claims.

I claim:

1. A pulse echo-type signal system comprising means to transmit recurrent pulses, means to receive pulses corresponding to said transmitted pulses from remote objects during the intervals between said transmitted pulses, and gating means to control the sensitivity of said receiving means during the intervals between said transmitted pulses, said means to control including a square wave generator synchronous with said means to transmit to produce a square wave pulse, means coupled to said generator to control the duration of the square wave pulses, a first output path coupled to said generator, a second output path coupled to said generator including means to produce from said square wave pulse a pulse adjustable in both amplitude and time independently, a mixing means including a gain control coupled to said first output path and said second output path to superimpose on said square wave pulse said adjustable pulse to produce an adjustable complex control pulse, means to couple said complex control pulse to said receiving means for sensitivity control thereof, said mixing means including an electronic device having a combining electrode to which said pulses are applied to provide a complex control wave for receiver sensitivity, said control wave being variable in width, slope and amplitude.

2. A pulse echo-type signal system comprising means to transmit recurrent pulses, means to receive pulses corresponding to said transmitted pulses from remote objects during the intervals between said transmitted pulses, and gating means to control the sensitivity of said receiving means during the intervals between said transmitted pulses, said means to control including a square wave generator synchronous with said means to transmit to produce a square wave pulse, means coupled to said generator to control the duration of the square wave pulses, a first output path coupled to said generator, a second output path coupled to said generator including an adjustable means to produce from said square wave pulse a waveform adjustable in both amplitude and time independently, a mixing means coupled to said first output path and said second output path to superimpose on said square wave pulse said waveform to produce a variable complex control pulse whereby said adjustable means cooperates with said square wave generator to produce an increasing amplitude characteristic for the initial portion of said complex control pulse, said increasing amplitude having an adjustable initial value, and a constant amplitude characteristic continuous with said increasing amplitude characteristic for the remaining portion of said complex control pulse, means to couple said complex control pulse to said receiving means for sensitivity control thereof, said mixing means including an electronic device having a combining electrode to which said pulses are applied to provide a complex control wave for receiver sensitivity, said control wave being variable in width, slope and amplitude.

3. A pulse echo-type signal system comprising means to transmit recurrent pulses, means to receive pulses corresponding to said transmitted pulses from remote objects during the intervals between said transmitted pulse and gating means to control the sensitivity of said receiving means during the intervals between said transmitted pulses, said means to control including a single shot multivibrator synchronous with said means to transmit to produce a square wave pulse, means coupled to said multivibrator to control the duration of the square wave pulses, a first output path coupled to said multivibrator including a differentiating circuit to produce from said square wave pulse a pulse adjustable in both amplitude and time independently, a mixing means including a gain control coupled to said first output path and said second output path to superimpose on said square wave pulse said adjustable pulse to produce a variable complex control pulse, and means coupled to said mixing means to couple said complex control pulses to said receiving means for sensitivity control thereof, said mixing means including an electronic device having a combining electrode to which said pulses are applied to provide a complex control wave for receiver sensitivity, said control wave being variable in width, slope and amplitude.

4. A pulse echo-type signal system comprising means to transmit recurrent pulses, means to receive pulses corresponding to said transmitted pulses from remote objects during the intervals between said transmitted pulses, and gating means to control the sensitivity of said receiving means during the intervals between said transmitted pulses, said means to control including a single shot multivibrator synchronous with said means to transmit to produce a square wave pulse, a time constant network included in said multivibrator, a variable component included in said time constant network to adjust the width of said square wave pulse, a first output path coupled to said multivibrator, a second output path coupled to said multivibrator in parallel relationship with said first output path, said second output path including a differentiating network, a variable means coupled to the input of said differentiating network to adjust the amplitude of said square wave pulse applied thereto, and a variable component included in said differentiating network to adjust the width of the output signal therefrom, the components of said second output path cooperating to produce from said square wave pulse, a pulse adjustable in both amplitude and time independently, a mixing circuit including a variable voltage source coupled to said first output path and said second output path to adjust the amplitude of said square wave pulse and to superimpose on said square wave pulse said adjustable pulse to produce a variable complex control signal having a first portion whose amplitude increases with respect to time and a second portion continuous with said first portion whose amplitude is constant with respect to time, the characteristics of said second portion being adjusted by said variable component of said time constant network and said variable voltage source of said mixing means and the rate of increase of said first portion being adjusted by said variable means at the input of said differentiating network and said variable component within said differentiating network, means coupled to said mixing means to couple said complex control pulse to said receiving means for sensitivity control thereof, said mixing means including an electronic device having a combining electrode to which said pulses are applied to provide a complex control wave for receiver sensitivity, said control wave being variable in width, slope and amplitude.

References Cited in the file of this patent

UNITED STATES PATENTS

| | | |
|---|---|---|
| 2,420,200 | Schoenfeld | May 6, 1947 |
| 2,537,589 | Johnson | Jan. 9, 1951 |
| 2,583,173 | Hargens | Jan. 22, 1952 |
| 2,624,871 | Meagher | Jan. 6, 1953 |